United States Patent [19]
Leone et al.

[11] Patent Number: 4,593,337
[45] Date of Patent: Jun. 3, 1986

[54] VIDEO CASSETTE PLAY COUNTING, STORING AND READING SYSTEM

[75] Inventors: Alfredo Leone, 785 Park Ave., New York, N.Y. 10021; Joel B. Snyder, Plainview, N.Y.

[73] Assignee: Alfredo Leone, Brooklyn, N.Y.

[21] Appl. No.: 475,841

[22] Filed: Mar. 16, 1983

[51] Int. Cl.$^4$ .................. G11B 5/027; G11B 23/02; G11B 15/48
[52] U.S. Cl. ................... 360/137; 360/74.4; 360/74.5; 360/85; 360/132
[58] Field of Search ............ 360/132, 85, 93, 96.5, 360/137, 74.4–74.7

[56] References Cited

U.S. PATENT DOCUMENTS

| | | |
|---|---|---|
| 2,477,146 | 7/1949 | Scherbatskoy . |
| 3,601,557 | 8/1971 | Lennox . |
| 3,604,624 | 9/1971 | Miura . |
| 3,630,170 | 12/1971 | Christo . |
| 3,678,215 | 7/1972 | Kihara . |
| 3,761,643 | 9/1973 | Keeler . |
| 3,995,319 | 11/1976 | Harris . |
| 4,338,644 | 7/1982 | Staar ..................... 360/132 |
| 4,475,222 | 10/1984 | Egendorf . |

Primary Examiner—A. J. Heinz
Attorney, Agent, or Firm—Brumbaugh, Graves, Donohue & Raymond

[57] ABSTRACT

A system for counting videotape cassette play includes a counter sealed within the cassette to count plays. A count signal is provided on the tape or a movable part of the cassette. Coded access circuitry allows retrieval of the count. Discrimination circuitry discriminates between a count signal passing an internal head at the slowed play speed, as opposed to the fast-forward and rewind speeds. A rental agent's unit is a decoder that is programmed with the correct digital code word that permits access to the count stored in the cassette's circuitry. A decoding and display circuit converts the count to a visible numeric display for the rental agent. Resetting the cassette's counter is prohibited except in the presence of the digital code word. The count signal can be electromagnetically recorded at a frequency distinct from the audio and video content, can be an opening or transparency optically detectable, can be a reflective segment optically detectable, or a conductive segment bridging contacts that engage the tape. Frequency and duration of the signal provide means to recognize the signal passing the pickup at play speed. Certain embodiments of the system provide further information such as tape source, rental rate, or title. This information is contained in the count signal or in separate memory.

42 Claims, 12 Drawing Figures

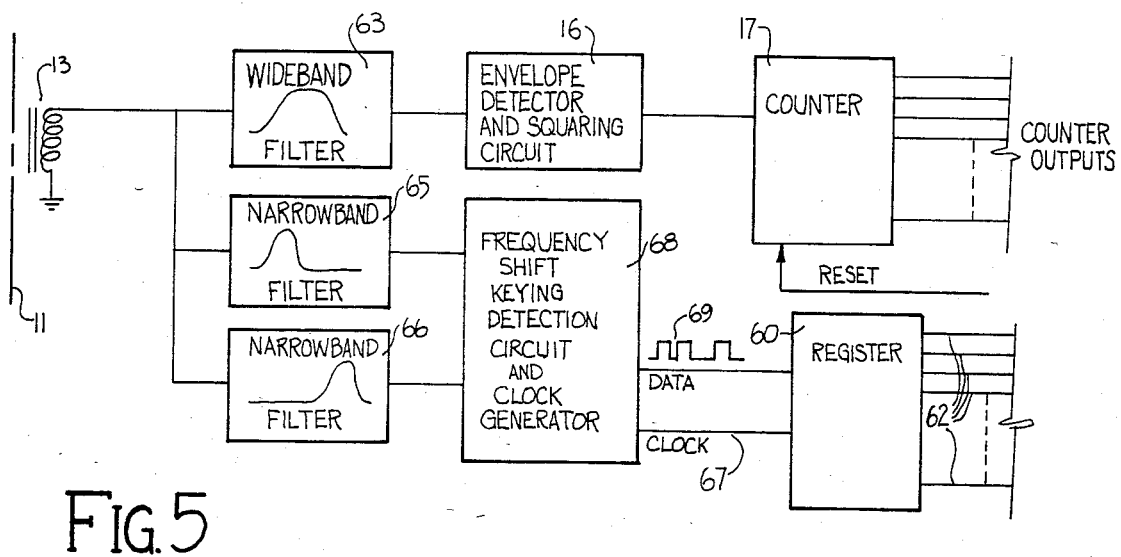
FIG. 5
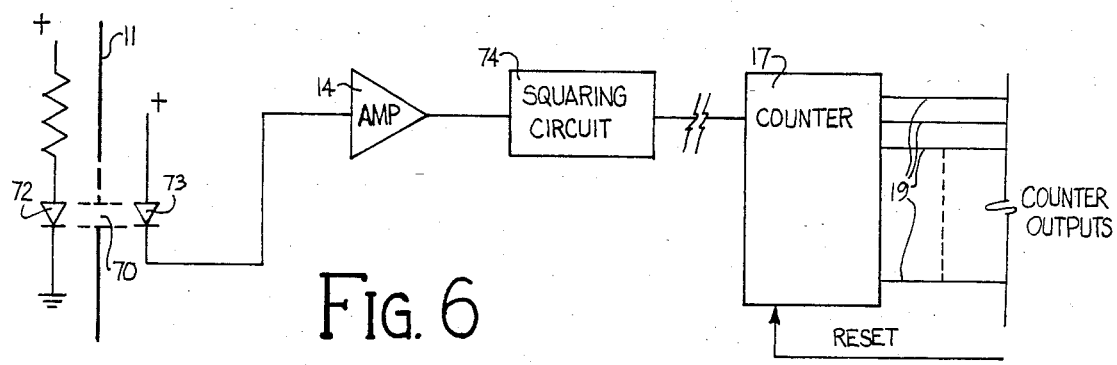
FIG. 6
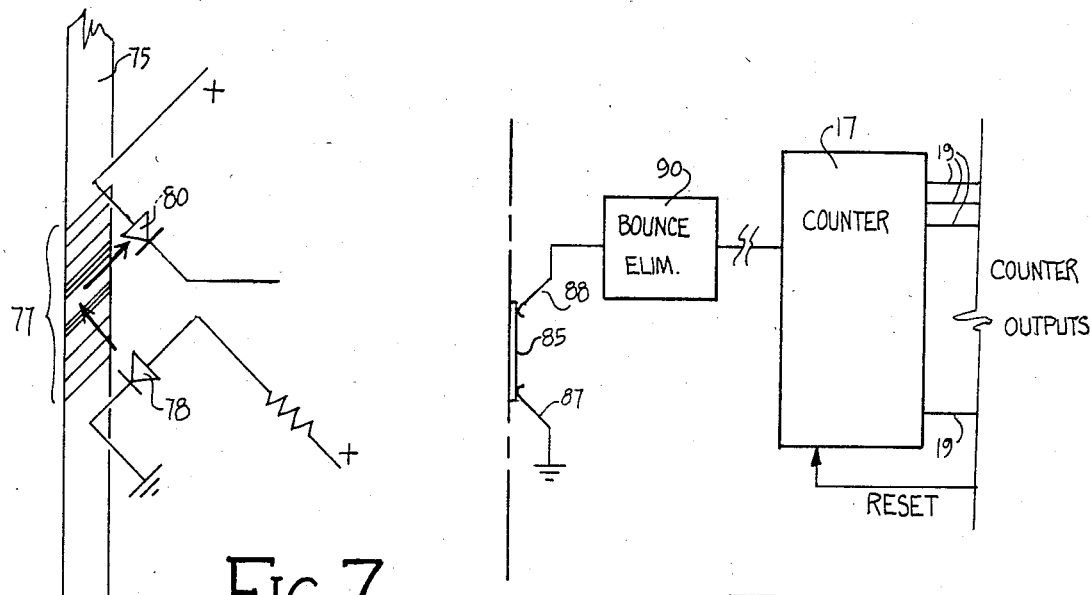
FIG. 7
FIG. 8

VIDEO CASSETTE PLAY COUNTING, STORING AND READING SYSTEM

BACKGROUND OF THE INVENTION

This invention relates to a system for counting the number of times a prerecorded video cassette has been played, and more particularly to a system for recording, storing, and reading the number of plays of a prerecorded video cassette.

Rentals of prerecorded video cassette programs for use with home video equipment has become a large and growing business. Video cassettes with prerecorded feature length films are rented for a fixed period of time at a fixed rental fee. The cassettes can be played and replayed as many times as the consumer desires during the rental period. The problem arises that cassettes can be shared and viewed by many people at separate times during the rental period. Swapping of rented cassettes is common. In swapping, two or more consumers each rent cassettes. Each views one, and then they borrow the other's rented cassette and view the borrowed cassette. For the rental fee of a single cassette, then, the renter is able to watch two or more programs. The effect of this is that the rental agent and persons and business entities that have invested in the property in a film or program are deprived of royalties and income to which they are rightly entitled. Studios, producers, directors, artists and writers lose royalties.

Clearly, rental fees based on the number of plays of a prerecorded cassette program would be preferred to the current practice. A count of total plays during a period can benefit the distributor who rents to the retail rental agent, as well as benefitting the retail rental establishment. Today, however, there is virtually no way of telling how many times a prerecorded program has been played and so the fixed fee rental prevails. This unfortunate situation deprives the consumer of exceptionally popular films in that major studios have resisted making their entire libraries available for rentals on the current inequitable basis.

Much of the video equipment available today has a counter that continuously counts as the video tape is run, but a counter on home equipment contributes nothing towards solving the problem of the rental agent's or the distributor's determining how many times a program has been played. The problem has been recognized for some time now, but it has been proposed to provide mechanical counters in cassettes to count the number of times a cassette is played. Mechanical counters are easily disengaged accidentally or intentionally. If the count is visible, it invites tampering. Unless the count can be reset, the one keeping the count must keep a running tally for each cassette. Consequently, no adequate arrangement for counting plays of a rental cassette program has found its way to the cassette rental marketplace.

BRIEF SUMMARY OF THE INVENTION

According to this invention a system is provided that counts program plays electronically. The number of plays is stored. A rental agent easily determines the number of times the prerecorded program of a rented cassette has been displayed and charges accordingly.

In particular, in preferred embodiments of the invention, the play count is electronically derived and stored in a machine readable form. The count is not apparent to the consumer and is not amenable to tampering. To retrieve the count, a particular code is necessary. At the rental agent's premises a decoder is provided. The decoder and the cassette have easily interconnectable terminals. One portion of these terminals provides, from the decoder to the cassette, a digital code word that enables the stored count to be retrieved from the counter in the cassette and displayed at the decoder. In an embodiment, in which the total count is not preserved for the distributor's use, the same code word enables resetting of the cassette counter to zero for a further rental. In one particular embodiment, the coding and counting circuitry of the cassette is powered by a small rechargable battery. Each cassette's battery is recharged or replaced with a freshly charged battery prior to a further rental. Again, it may be the distributor, renting each cassette to rental agents for, say, monthly periods, who reads the total monthly count, resets the counter, and seals in a new battery.

In a preferred embodiment, at a desired point on a video tape with a prerecorded program, a signal is provided. A pickup housed in the cassette detects the passage of the signal. A small integrated circuit in the cassette processes the signal for suitability for counting, and a counter circuit counts one play each time the signal passes the pickup at the correct speed.

Speed discrimination can be provided in several ways. In one arrangement the signal recorded on the tape is a signal of a particular frequency magnetically recorded on the tape. The frequency is distinct from the audio and video signals on the tape. The signal is picked up, amplified and passed to a filter that passes that frequency, but discriminates against the higher frequency produced when the signal on the tape passes the pickup at the faster fast-forward and rewind speeds. The filter passes the proper frequency electrical signal to pulse shaping circuitry, typically an envelope detector and squaring circuit that shapes the signal into a pulse suitable for use by a counter circuit.

Recognition of the signal recorded on the tape and its passage at correct speed can alternatively be on the basis of duration. Circuitry suitable to recognize a signal of the appropriate duration discriminates between the signal passing at the slower play speed and the faster fast-forward and rewind speeds.

The signal on the tape can be an optical signal. It can be a small hole or transparency cooperating with a light source, preferably infrared, and a photoelectric detector, or it can be a reflective segment, again for use with a light source and a photodetector. Alternatively, the signal can be a conductive segment and associated electrical contacts bridged by the conductive segment to produce the pulse that is counted. It is possible, as well, to derive the play count signal from the reels or other moving parts of cassette.

A particularly attractive advantage of this invention is that it lends itself to providing additional information other than just the number of plays. In one embodiment, for example, the signal recorded on the tape is an amplitude modulated intermediate frequency electromagnetically recorded. An AM detector recognizes the signal. Again a filter discriminates between the signal and other recorded portions of the tape as well as the higher frequency fast-forward and rewind generated responses. An envelope detector and squaring circuit shapes the pulse and it is counted. In this arrangement, however, the amplitude modulation can carry additional information. Such information might be, for example, the cassette source, e.g. the studio or the distributor from whom the rental agent rents the cassette, the rental rate, and even an identification of the program, information that is useful to determine what cassettes are in greatest demand. Likewise, where the signal is a reflective strip, optically detected, coded interruptions in the reflectance, similar to those printed on packages and scanned at the supermarket, provide another approach to recording and retrieving more than just the number of program plays.

The foregoing and other objects and advantages of the invention will be better understood with reference to the specific preferred embodiments set forth in the following detailed description and illustrated in the accompanying drawings.

DESCRIPTION OF DRAWINGS

FIG. 5 is a schematic showing a cassette circuit using frequency shift keying for information in addition to the count.

FIG. 6 is a schematic illustration of an optical arrangement for detecting the passage of a tape opening or transparency.

FIG. 7 is a further schematic illustration of an optical pickup cooperating with a reflective segment serving as the signal on the tape.

FIG. 8 schematically illustrates another arrangement whereby a conductive segment serves as the signal on the tape sensed by the circuitry in the cassette to provide a play count.

DESCRIPTION OF PREFERRED EMBODIMENTS

Figure 1:
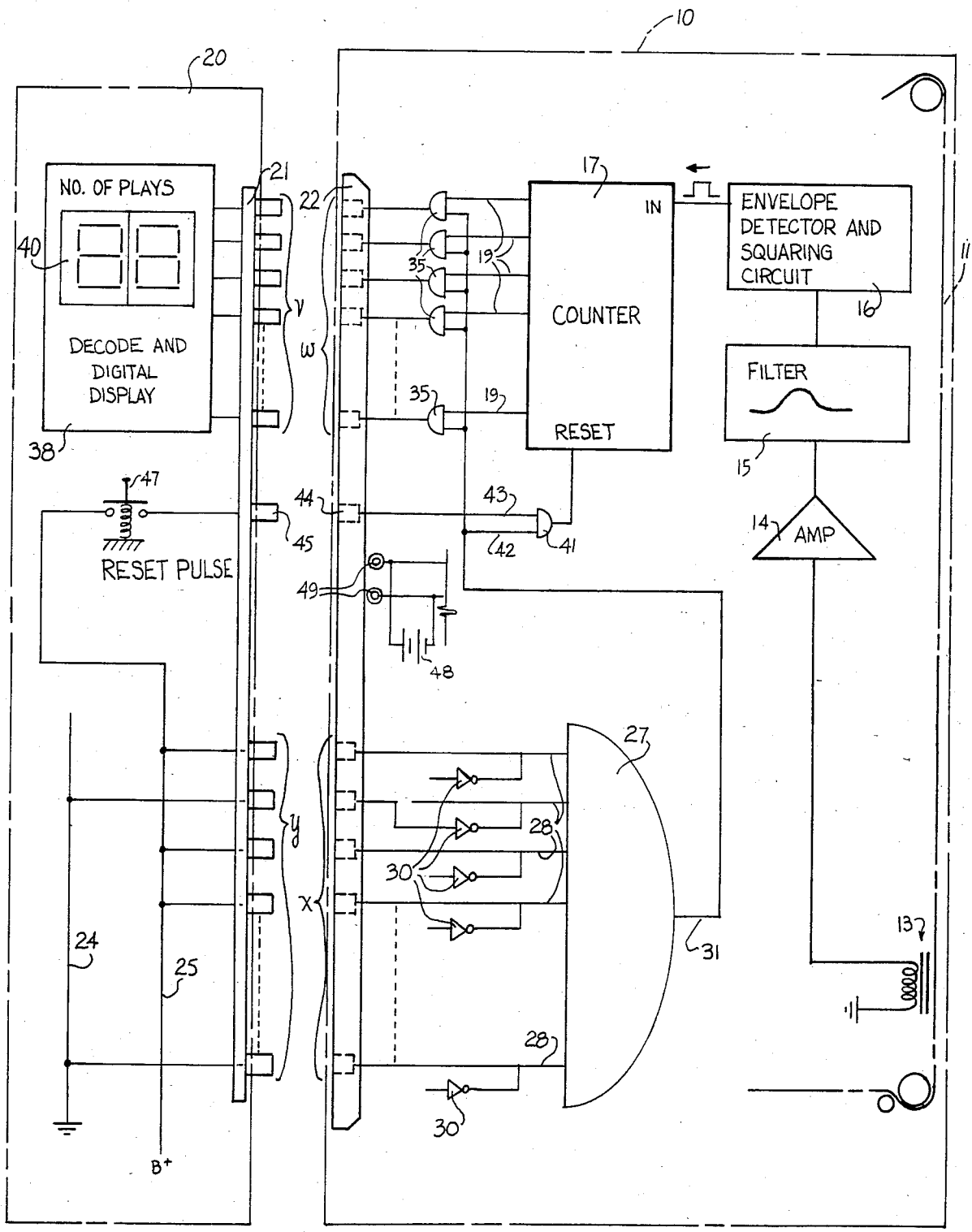
FIG. 1 is a schematic illustration in block diagram form of a cassette and play counting arrangement according to the invention and including, in a cassette, a pickup, recognition and pulse shaping circuitry, a counter, and coding provisions for permitting access to the count stored by the counter.

In FIG. 1, a video tape cassette 10 contains the usual two reels and mechanical arrangements (all of which are not shown) for advancing the tape conventionally along a path 11 past an external head on a video tape player. An internal electromagnetic pickup or head 13 is located adjacent to the tape path at a location free of interference with the winding and unwinding of the tape and removed from the location where the external head cooperates with the tape. The output of the head 13 connects with the circuit provisions of FIG. 1, which are preferably provided on a specially prepared integrated circuit board housed within the cassette. The cassette housing thickness may be increased in part or in whole to accommodate the integrated circuit board. Most or all commercially available video equipment has sufficient clearance to accommodate any slight thickness increase that an IC board may require.

On the video tape, preferably well into the program prerecorded on the tape, a distinct count signal is recorded. In the embodiment of FIG. 1, the signal is of a frequency distinguishing it from the audio and video program content of the tape. The count signal is picked up by the head 13, amplified by an amplifier 14, and passed to a filter 15. The filter 15 passes signals of the preselected, distinct frequency of the count signal. Audio and video signals are blocked by the filter 15. Likewise, the filter 15 blocks the higher frequency that results from the count signal passing the head 13 at the faster fast-forward and rewind speeds of home video equipment. When the count signal passes the head 13 at the ordinary play speed, then, the filter 15 passes the signal to an envelope detector and squaring circuit 16 that, in known fashion, converts the signal into a well defined pulse. The output pulse of the squaring circuit is input to a counter 17. The counter 17 counts the number of pulses supplied to its input and establishes at its outputs 19 a digital count. The digital count in this as well as all other embodiments can be binary, BCD, or another code representative of the count. The digital count is stored at the counter and represents the number of times the program prerecorded on the tape has been played.

At the rental agent's establishment and at the distributor's, a decoding unit 20 is employed to decode and display the digital count indicating the number of plays of a rented cassette. The decoding unit 20 includes a terminal strip 21 adapted to mate with a terminal strip 22 of the cassette. A series of connectors y on the decoder terminal strip 21 match a series of terminals x on the cassette terminal strip 22. The decoder terminals y bear a digital code word allowing access to the count stored in the counter 17. The digital code word on the terminals y is provided by selective connection of the terminals y to a ground line 24 or a B+ line 25. In other words, those terminals connected to ground represent a binary 0, while those connected to B+ represent a binary 1. In the cassette, logic circuitry in the form of an AND gate 27 has inputs 28 connected, either directly or through one of a series of inverters 30, to the x terminals of the cassette terminal strip 22. The AND gate 27 is coded to respond to the preselected digital code word by having those inputs 28 associated with a grounded y terminal connected through one of the inverters 30. Thus it will be seen that, when applied to a series of terminals bearing the correct digital code word, each input to the gate 27 is provided with a binary 1 or high input. The application of the correct code word to the terminals x of the cassette produces a high output or binary 1 at the output line 31 from the gate 27. This high output is applied to a series of AND gates 35 whose outputs connect to output terminals of the cassette terminal strip 22. The remaining inputs of the AND gates 35 are the individual outputs 19 of the counter 17. When a high output is produced on the line 31 by the AND gate 27, then, the digital count appears at output terminals w of the cassette terminal strip 22. A matching series of input terminals v on the decoder terminal strip 21 connects to a numeric display module 38. Typically the module 38 can be one of the commercially available integrated LCD decoding and display circuits that converts the digital count applied to its input to the appropriate numeric LCD display. At the rental agent's, a representation 40 of the number of plays is thus provided by the decoding unit 20.

Those familiar with digital circuitry will recognize that several encoding arrangements or techniques can serve to effect code word protection of the count information. For example, to name just two alternatives, exclusive OR logic can function in much the same manner as the AND logic of FIG. 1, or a ROM or other memory can be addressed by the code word to retrieve an output enabling reading of the counter.

Within the cassette one additional AND gate 41 connects to the reset connection of the counter 17. The output of the AND gate 27 connects to one input 42 of the AND gate 41. When the correct code word results in a high output at line 31, the AND gate 41 is enabled, so that a high input at its remaining input 43 produces a high output from the gate 41 resetting the counter 17. The input 43 connects to a further, reset terminal 44 on the cassette terminal strip 22. A reset terminal 45 on the decoder terminal strip 21 cooperates with the terminal 44. The reset terminal 45 of the decoder is connected through a manual normally open switch 47 to B+. After the number of plays is noted, actuation of the switch 47 resets the counter 17.

During rental, each play results in an additional count being stored at the counter outputs 19. When the cassette is returned by the consumer, the rental agent engages the cooperating terminal strips 21 and 22 of the decoder and the cassette, notes the number of plays, and resets the counter.

Preferably, a small rechargable battery 48 is sealed within the cassette 10 and supplies electrical power to the circuitry therein. A pair of terminals 49 are provided for connection to a battery charger, not shown. The rental agent recharges the battery 48 prior to each rental or seals a previously recharged battery into the cassette before each new rental.

If the counting arrangement of FIG. 1 is to be used by the distributor to determine the distributor's charge for the cassette rented to the rental agent, then the reset provisions of FIG. 1 are not made accessible to the rental agent. The counter retains a total cummulative count of the plays by the several consumers renting from the rental agent. The distributor resets the counter. This puts the rental agent (or his decoder) to the task of subtracting the count at the time of return of the cassette from the count at the time the cassette was rented. On the other hand, this enables the distributor to be sure that his rental is based on total tape plays. Battery replacement can be the distributor's responsibility as well and can be scheduled to coincide with the distributor's reading of the count and resetting of the counter.

Figure 2:
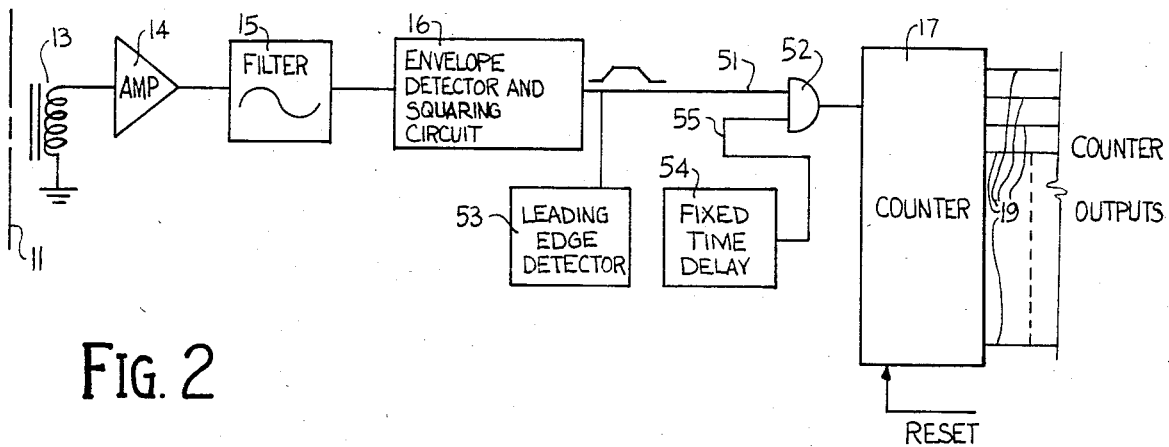
FIG. 2 is a schematic illustration of an alternative cassette circuit employing both frequency recognition and duration sensing for recognizing the signal.

Several circuit arrangements are useable within the cassette to provide a count of the number of plays of a rented cassette. In FIG. 2, the count signal recorded on the tape is recognized both on the basis of its frequency and its duration. The duration of the signal passing the head 13 at the slower "play" speed distinguishes it from the shorter duration of the signal passing the head at the faster fast-forward and rewind speeds. Like provisions bear numerals like those of FIG. 1. Amplified by the amplifier 14, the signal is fed to the filter 15, which passes it on the basis of its frequency. The signal is then provided to the envelope detector and squaring circuit 16, which produces an output in the shape of the envelope of the recorded count signal. This envelope is supplied to a first input 51 of an AND gate 52. A leading edge detector 53 is connected to the output of the envelope detector. The edge detector 53 produces a pulse indicative of the occurrence of the leading edge of the envelope-shaped output from the envelope detector and feeds that pulse to a fixed time delay 54. After the fixed time of the delay, representing something slightly less than the duration of the tape signal at normal play speed, the fixed time delay provides a high output to the remaining input 55 of the AND gate 52. A high output from the AND gate 52 now is input to the counter 17, which counts each such occurrence and retains the count in digital form at its outputs 19. Again, the counter outputs and, if desired, its reset are connected to the logic circuitry that, in FIG. 1, serves to permit access to the count only in the presence of a predetermined digital code word. It will be appreciated that the filter 15 and the duration determining provisions 51-55 of FIG. 2 are functionally redundant and ordinarily would be alternative approaches to tape speed detection.

Figure 3:
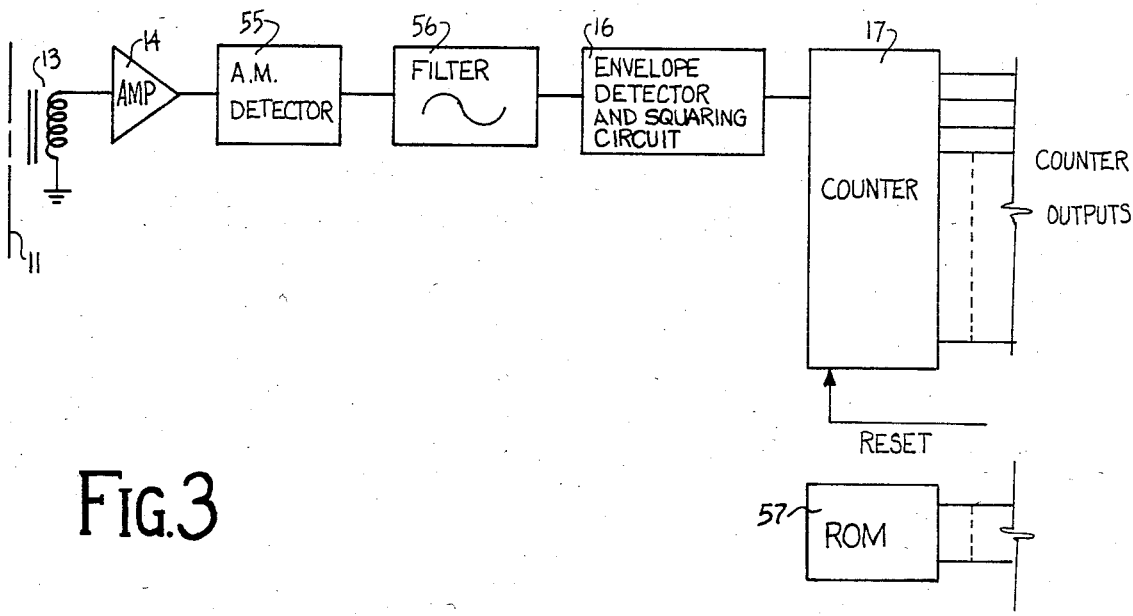
FIG. 3 is a further schematic illustration of an arrangement in which amplitude modulation detection is used in connection with the signal on the tape.

The circuitry in the cassette may supply additional information such as, for example, the rental rate, an identification of the program for record keeping, or the particular distributor or source from which the rental agent receives the cassette, useful for bookkeeping purposes. In FIG. 3 a head 13 picks up the count signal from the tape. In this case, the signal is an amplitude modulated signal, again distinct from the audio and video content of the prerecorded tape. The electrical signal from the head 13 is amplified by the amplifier 14 and passed to an amplitude modulation detector 55. A filter 56 passes the modulation, which is of a predetermined frequency when the prerecorded count signal passes the head 13 at the normal play speed. Again, an envelope detector and squaring circuit 16 shapes an output pulse that it supplies to a counter 17, and again at the outputs of the counter 17 a digital representation of the number of plays is held. A reset terminal of the counter allows its being returned to zero and coded digital password logic like that of FIG. 1 connects to the counter outputs to permit access only to the authorized dealer. A ROM 57 stores additional information that is made accessible, via further terminals, to a decoder like the decoder 20 of FIG. 1. Information in ROM, or other memory if desired, can be the rental rate, the cassette source, the particular program, or the like. For this purpose, further decoding provisions can be provided at the decoder 20 that may be any of numerous known circuits for converting the ROM information to machine readable, displayed, or printable information.

Figure 4:
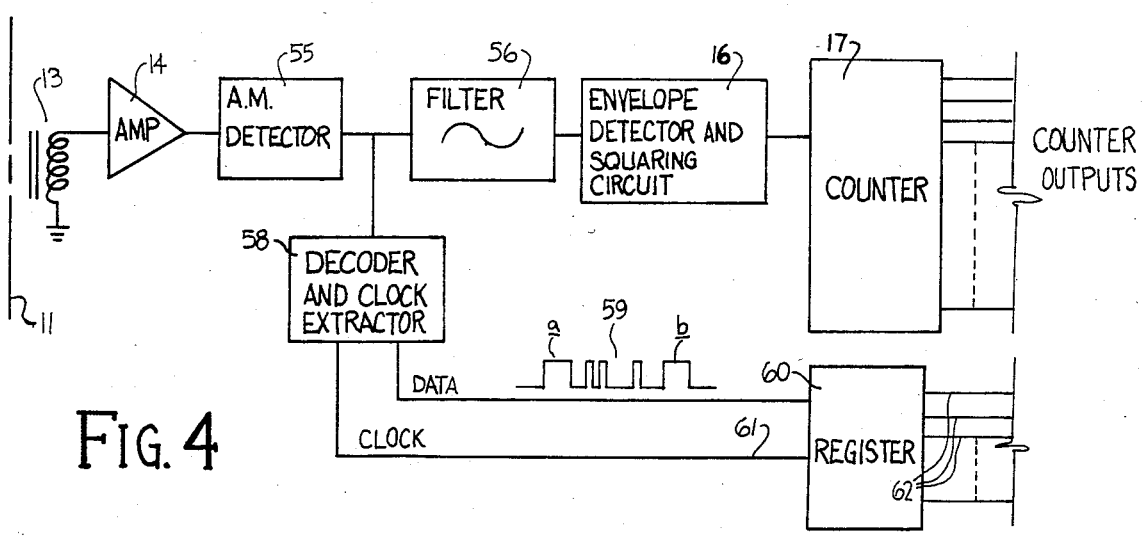
FIG. 4 is a schematic showing a cassette circuit using amplitude modulation to provide information in addition to count.

The circuit of FIG. 4 detects not only the count, but additional information provided in the count signal itself. For the purpose of counting the number of plays, the circuit provisions of FIG. 4 are identical to those of FIG. 3 with a head 13, amplifier 14, AM detector 55, filter 56, envelope detector and squaring circuit 16, and counter 17. The amplitude modulation of the count signal on the tape can contain additional information, however, and for that purpose an amplitude modulation decoder and clock extractor 58 receives the output of the AM detector 55 as well. The signal on the tape is encoded with information and a built in clock. A pulse train 59 is generated representing the information. It is supplied to a register 60 that is timed by the extracted clock 61 to detect the pulse train 59, which is then stored at the parallel outputs 62 of the register for use by the decoder at the rental agent's premises. The count signal is recorded on the tape to produce in the pulse train 59 a recognizable "begin" pulse a and a recognizable "end" pulse b that signal the register 58 to begin and end storage of the pulse train. An AND gate array like the AND gates 35 of FIG. 1 may connect the register as well as the counter to output terminals, and an AND date 27 can make the outputs 62 and 19 accessible only to the authorized rental agent.

In FIG. 5, information in the count signal is provided somewhat differently. Again, a head 13 picks up the signal in a frequency band that is distinct from both the program content and the higher frequencies of fast-forward and rewind. A wide band filter 63 passes all frequencies within the band of frequencies of the count signal, but discriminates against the program content and the fast-forward and rewind frequencies. Again the envelope detector and squaring circuit 16 produces a pulse indicative of a single count, and a counter 17 like those described above holds the count at its outputs. Once again the logic circuitry forbidding unauthorized access to the count is not shown, but should be understood to be connected to the outputs of the counter 17. Additional information content in the frequency band of the count signal is detected in a frequency shift keying arrangement. Within the count signal, information content is frequency modulated within the wider band of frequencies passed by the wide band filter 63. To one side of the band, frequencies representing a binary one or high condition are passed by a first narrow band filter 65. To the other side of the frequency band, frequencies representing the binary zero or low condition are passed by a second narrow band filter 66. Known frequency shift keying detection circuitry 68 converts the outputs of the two narrow band filters to the binary ones and zeros that they represent and generates a clock 67. Again, a serial pulse train 69 is converted to parallel and stored at the outputs of a register 60. The frequency shifts within the count signal recorded on the tape, then, can contain desired further information. In each arrangement in which a seperate register receives data in addition to the count from the signal on the tape, the presence of data in the register is a further affirmation that the tape was played.

In FIG. 6 the signal on the tape is provided by an aperture or transparency 70. On one side of the tape path 11 an LED 72 illuminates the tape. On the opposite side of the tape, and positioned to receive light through the aperture or transparency 70, a photoelectric detector 73 provides an output pulse when passage of the aperture or transparency permits light from the LED 72 to reach the detector 73. The output of the detector 73 is amplified by an amplifier 14 whose output is shaped, if necessary, by a squaring circuit 74 or another convenient pulse shaping circuit such as a comparator with hysteresis. The output of the squaring circuit can be verified on the basis of duration in the manner of the circuit of FIG. 2 and provided to the counter 17 to be counted and stored. Again the remainder of the circuit is preferable as in FIG. 1.

In FIG. 7, the tape 75 has affixed thereon a reflective segment 77. An LED 78 illuminates the tape on the side to which the segment 77 is affixed. A photoelectric detector 80 is positioned to receive light emitted by the LED 78 and reflected to it from the reflective segment 77. Again, the duration of the signal can be used to verify passage of the reflective segment 77 at the slower play speed. Additional information can be encoded on the reflective segment by nonreflective marks or stripes 81 imprinted thereon. Decoding of the information is carried out in substantially the same fashion as the decoding of product information codes on packages at the supermarket counter.

One further count producing arrangement using the tape is illustrated in FIG. 8 where a conductive segment 85 is applied to the mylar or nonconductive side of the tape. A pair of contacts 87 and 88 are bridged by the conductive strip passing in contact therewith. A known bounce elimination circuit 90 in the cassette eliminates contact chatter, and the output pulse is verified, for example, by duration as in FIG. 2, counted by the counter 17, and stored at the counter's outputs 19 for access as described above.

Figure 9:
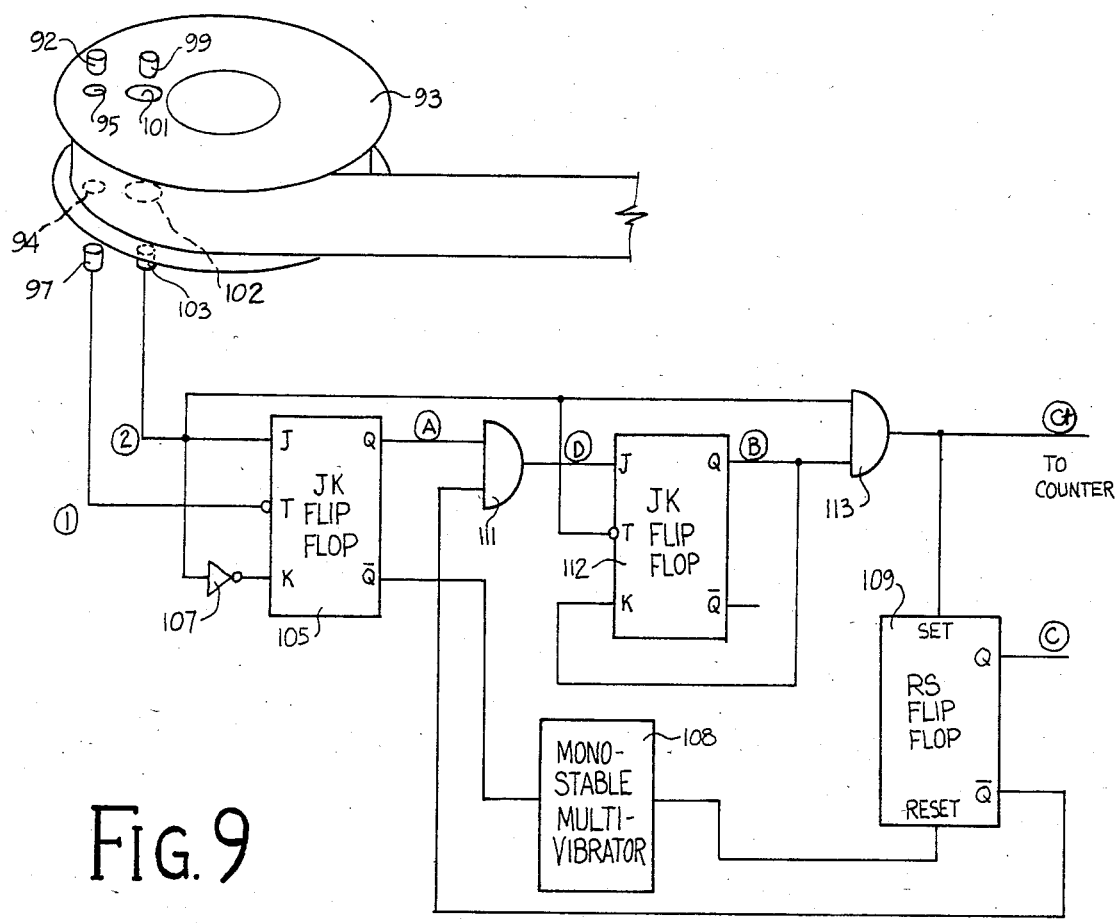
FIG. 9 is a schematic illustration of an arrangement in which an opening in the tape reel cooperates with an optical detector and counting circuitry.
Figure 9A:
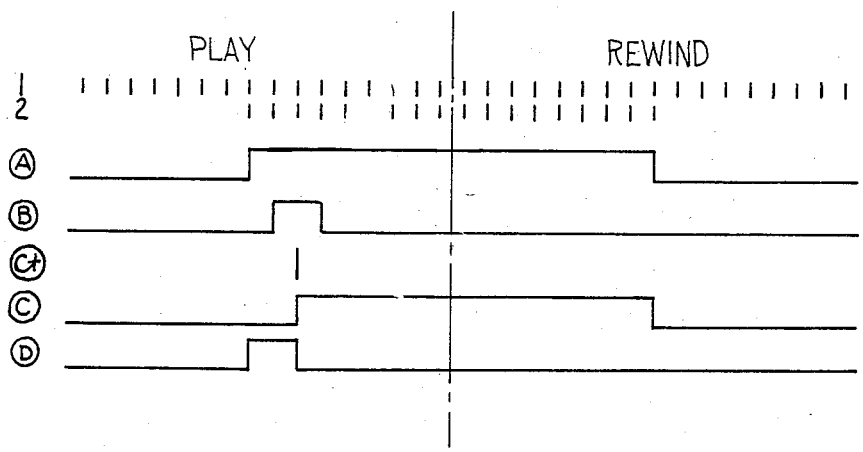
FIG. 9a is a pulse diagram illustration of the operation of the circuit of FIG. 9.

FIG. 9 represents one alternative arrangement deriving the count signal from the movable mechanical elements of the cassette rather than the tape. An LED or other light source 92 illuminates one of the cassette reels 93. Openings 94 and 95 in the reel pass the light source in alignment with the light source. When sufficient tape has been played, light from the source 92 passes through the openings 94 and 95 to a photodetector 97 to change the state of the detector and produce pulses for the remainder of the program playing time and during rewind until the tape again fills enough of the reel to block the holes. A second light source 99 illuminates the reel 93 closer its center. Openings 101 and 102 pass that source when the reel turns. A photodetector 103 receives light pulses from the source 99 when the tape has been wound off the reel sufficiently to expose the source 99 to the detector 103 through the holes 101 and 103. FIG. 9a illustrates the pulses produced during play and rewind. The pulses of line 1 are those produced by the detector 97. The line 2 pulses are from detector 103.

For the purpose of the following description of the operation of the circuit of FIG. 9, flip-flops 105, 109 and 112 are assumed to be in the reset condition. The detector 97 delivers its output pulse train to the T input of a JK flip-flop 105. Until pulse train 2 from detector 103 begins, the J input of the flip-flop 105 connected to the detector 103 is low and K input, connected through an inverter 107 to the detector 103, is high. The $\overline{Q}$ output is thus high. The $\overline{Q}$ output of the RS flip-flop 109 is high at this point and will remain so until that flip-flop is set. This output is the inverse of line C of FIG. 9a. The first pulse of the pulse train 2 (FIG. 9a) provides a high J input and a low K input to the flip-flop 105, hence its $\overline{Q}$ output goes high as per line A of FIG. 9a. An AND gate 111 now has the requisite two high inputs to provide a high output as portrayed in line D of FIG. 9a. A further JK flip-flop 112 is now receiving pulse train 2 at its T input and the high output D from the AND gate 111 at its J input. Its Q output becomes high one pulse later, line B, FIG. 9a. This high output is input to another AND gate 113. The next pulse in the pulse train 2 is applied as the second high input to the AND gate 113 and its output is counted, line Ct, FIG. 9a. This represents one play of the cassette.

The counted pulse Ct also sets the RS flip-flop 109. The $\overline{Q}$ output of this flip-flop goes low and consequently the output of the AND 111, pulse train D, goes low. The J input of JK flip-flop 112 is thus low. Its output $\overline{Q}$ goes low one pulse later, pulse train 3. The low $\overline{Q}$ output of flip-flop 112 is a low input to the AND 113 and as a result the output Ct of the AND 113 stays low during the remaining playing time.

During rewind, FIG. 9a, each flip-flop and gate remains the same until the end of tape fills the reel sufficiently to block light passage through the holes 101 and 102. Pulse train 2 ends and the J input of the JK flip-flop 105 remains low while its K input becomes high by virtue of the inverter 107. The $\overline{Q}$ output of flip-flop 105, pulse train A, takes its low state and its $\overline{Q}$ output becomes high. The high-going $\overline{Q}$ output of the flip-flop 105 triggers the multivibrator 108 to reset the RS flip-flop 109. The $\overline{Q}$ output of the flip-flop 109, the inverse of C, again goes high, supplying a high input to the AND 111. The same conditions now exist as at the beginning of the counting operation and a further play will result in one more pulse Ct, to be counted in just the same way.

Figure 10:
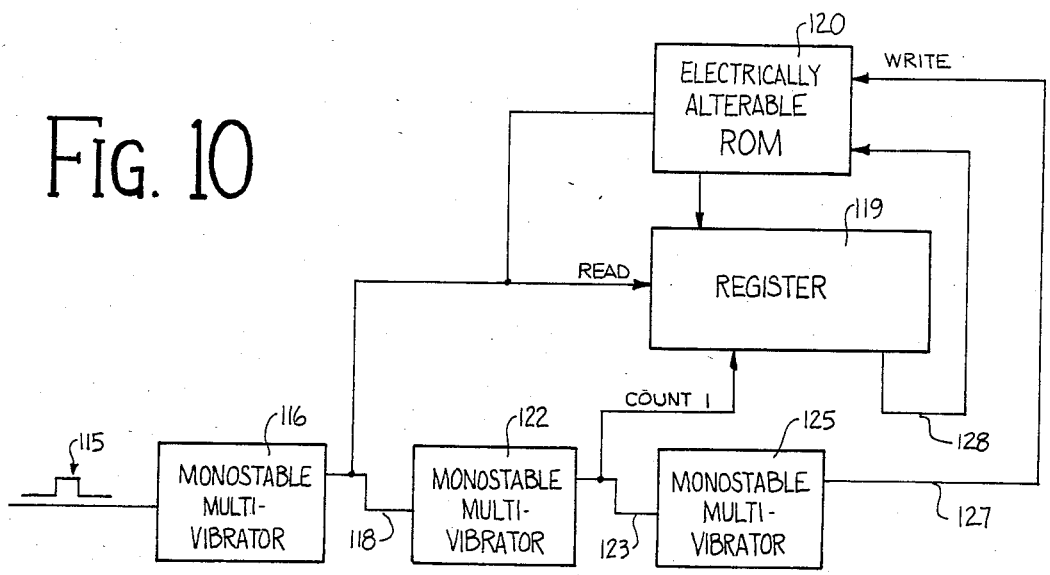
FIG. 10 is a schematic illustration in block diagram form of an alternative count retaining circuit.

In FIG. 10, one means to retain the total count is provided. Each play produces a single pulse 115, in any of the ways described above for example. This pulse triggers a first monostable multivibrator or single shot 116. The high output 118 of the multivibrator 116 instructs a register or counter 119 to read. The total count held in an electrically alterable ROM 120, or other revisable memory, is read, loading the register 119 with that count. The high output 118 of the multivibrator 116 is input to a second monostable multivibrator or single shot 122. This multivibrator's output 123 becomes high. The output 123 is connected to the register 119 so as to be counted. This adds one play to the count in the register. The output 123 is also input to a third monostable multivibrator or single shot 125. The output 127 of this third multivibrator is used to indicate that the count in ROM 120 is to be electrically altered and the new total count available at the output 128 of the register 119 is placed in ROM 120, accessible to decoding equipment properly coded with an access word as set forth above.

Figure 11:
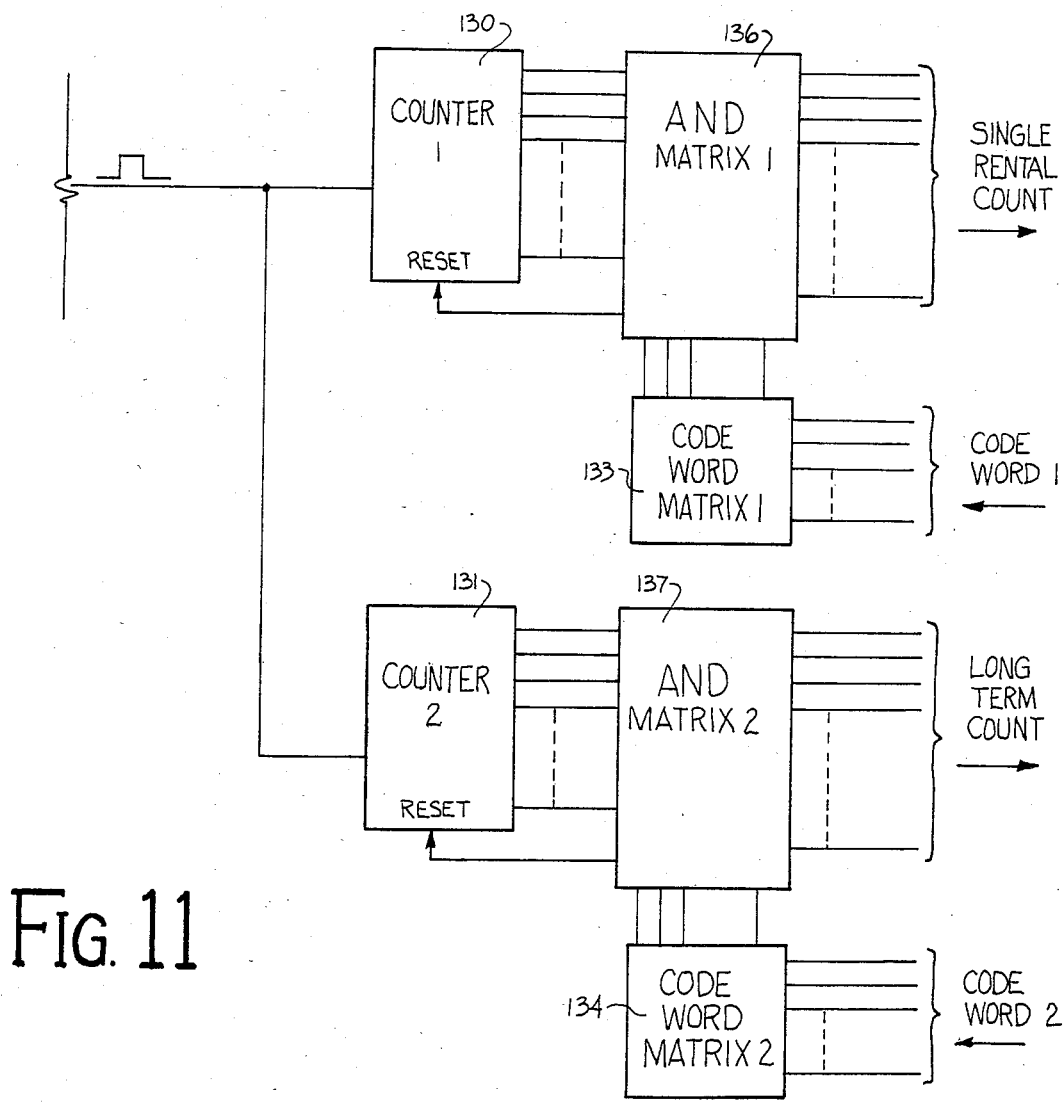
FIG. 11 is a schematic illustration in block diagram form of portions of a cassette circuit with two counters and coding arrangements.

If both the single rental count and a longer term count, covering, for example, the rental agent's period of rental from a distributor, are to be held and made accessible, two parallel counters 130 and 131 can be provided in one of the foregoing embodiments, as in FIG. 11. There, two code word access arrays 133 and 134, like provisions 27, 28, and 30 of FIG. 1, but with two different code words, cooperate respectively with two AND arrays 136 and 137, like gates 35 and 41 of FIG. 1. Each code word array is encoded with a different code word, one allowing reading and resetting of the counter 130 by the rental agent, and the other allowing reading and resetting of the remaining counter 131 by the distributor.

It will be seen, then, that systems have been described for counting tape usage on the basis of plays of the program in a way ordinarily inaccessible to the renter and for the purpose of computing the rental fee. The system makes available additional information with respect to the rented cassette and verification of the count signal is provided. It will be recognized that variations and modifications can be made in the foregoing preferred embodiments without departure from the spirit and scope of the applicants' invention, the scope of which is set forth in the appended claims.

We claim:

1. A prerecorded video tape cassette and program play counting combination insertable in and removable from a cassette player, wherein a single play count is representative of a complete play-back of an entire video program, the combination including a tape prerecorded with a video program, means in the cassette for electrically counting plays of the program, means in the cassette for electrically storing a play count counted by the means for counting, and means for protecting the counting and storing means from unauthorized access.

2. The combination according to claim 1 wherein the means for electrically storing a play count comprises electrically readable storage means having an output connection means accessible exteriorly of the cassette and connected for input from the counting means internally of the cassette.

3. The combination according to claim 1 further including second means in the cassette for electrically counting plays of the program, second means in cassette for electrically storing the a play count, and second protecting means for protecting the second counting and second storing means from unauthorized access.

4. The combination according to claim 1 wherein the means for electrically storing the play count comprises a revisable memory.

5. The combination according to claim 1 wherein the means for electrically counting comprises a signal on the tape, means in the cassette responsive to the signal on the tape, and means connecting the means for electrically counting and the means responsive to the signal.

6. The combination according to claim 5 wherein the signal on the tape comprises a frequency magnetically recorded on the tape, the means responsive comprises a pickup head, and, connected to the pickup head, means responsive to the frequency to produce an output electrical signal, said means for counting being connected to receive the output electrical signals and develop a count based thereon.

7. The combination according to claim 6, wherein the means responsive to the frequency comprises means for discriminating between the frequency of the signal on the tape passing the head at normal playing speed and the frequency of the signal on the tape passing the head at faster fast-forward and rewind speeds.

8. The combination according to claim 7, wherein the means for discriminating comprises a filter having a bandwidth passing the frequency of an electrical signal generated by the count signal on the tape detected by the head at normal playing speed and rejecting the frequency of an electrical signal generated by the signal on the tape detected by the head at the faster fast-forward and rewind speeds.

9. The combination according to claim 5, wherein the means responsive to the signal on the tape, comprises means proximate the path of movement of the tape in the cassette for detecting the movement of the signal therepast, means for discriminating between duration of the signal on the tape moving at normal playing speed past the means for detecting and duration of the signal on the tape moving past the means for detecting at faster fast-forward and rewind speeds.

10. The combination according to claim 5, wherein the signal on the tape is a visible indication, and the means responsive to the signal is optical pickup means for providing an electrical signal in response to passage of the signal on the tape.

11. The combination according to claim 10, wherein the signal on the tape comprises a reflective marker, the combination includes means for illuminating the marker, and the optical pickup means comprises photoelectric means for detecting light reflected from the marker to produce an electrical signal indicative of a play.

12. The combination according to claim 11, wherein the reflective marker has further information imprinted thereon for optical detection.

13. The combination according to claim 10, wherein the visible indication is a light conductive means in the tape, the combination further including means for illuminating the tape, the optical pickup means including photoelectric means positioned to receive light from the illuminating means passing through the light conductive means and for producing an electrical signal when thus illuminated.

14. The combination according to claim 5, wherein the signal on the tape is a conductive segment, and the means responsive to the signal comprises at least two contacts positioned to be electrically interconnected by the conductive segment as it passes.

15. The combination according to claim 5, wherein the signal on the tape comprises an electromagnetic signal having a preselected frequency and duration at normal playing speed, and said means responsive including means for detecting duration of the signal passing by the means responsive to the signal.

16. The combination according to claim 15, wherein the means responsive includes means for descriminating between the signal on the tape at the normal playing speed and at the faster fast forward and rewind speeds based on the detected duration.

17. The combination according to claim 5, wherein the signal on the tape is a modulated carrier frequency recorded on the tape, and the means responsive to the signal comprises pickup means mounted proximate the path of tape movement, the combination further comprising means connected to the pickup means and responsive to the modulation to produce an output.

18. The combination according to claim 17, wherein the carrier frequency is modulated with a preselected modulation frequency.

19. The combination according to claim 17, wherein the means responsive to the signal includes means for providing an output indicative of a program play in response to detection of only one of the carrier frequency and the modulation, and means for providing a second information output in response to detection of the remaining one of the carrier frequency and the modulation that did not result in a program play output from the means for providing an output.

20. The combination according to claim 19, wherein the means for providing an output indicative of a program play is responsive to the carrier frequency, and the means for providing a second information output comprises a modulation detector, the combination further comprising means for storing the second information output for subsequent retrieval.

21. The combination according to claim 19, wherein the signal on the tape has frequencies within a range of frequencies, wherein the means for providing an output indicative of a program play comprises means responsive to frequencies in the range of frequencies, and the means for providing a second information output comprises means for deriving the second output from variations of the frequencies in the range.

22. The combination according to claim 21, wherein the signal is frequencies shifted in the range of frequency, and the means for deriving the second output includes frequency shift decoding circuitry.

23. The combination according to claim 1 wherein the means for protecting the counting and storing means from unauthorized access comprises means for inhibiting determination of the play count by unauthorized persons.

24. The combination according to claim 23 wherein the means for inhibiting determination of the play count comprises a coded access circuit enabling electrical retrieval of the play count stored by the storing means and in addition to any addressing provisions of the storing means.

25. The combination according to claim 1 wherein the means for electrically counting comprises optical means for producing a play count signal representative to removal of a portion of the tape from a reel within a cassette.

26. The combination according to claim 25 wherein the optical means comprises illumination means and a photoelectric detector, the reel having an opening through at least one side thereof, and the illumination means and photoelectric detector being positioned to detect clearance of the hole when the tape wound on the reel is unreeled sufficiently to permit light passage through the hole to the other side of the reel.

27. A videotape cassette internal play counting circuit combination including pickup means in the cassette for producing at least one electrical signal representing a single complete play-back of an entire video program on the tape, and electrical counter means in the cassette connected to provide a digital electrical output indication of a counted number of program play-backs in response to signals produced by the pickup means and including means for storing the digital electrical output indication.

28. The combination according to claim 27, including an access circuit encoded to allow access to the stored digital output indication only upon application of a correctly coded signal thereto and to deny access in the absence of a coded signal and in the presence of an incorrectly coded signal.

29. The combination according to claim 28, wherein the access circuit means is a logic circuit having multiple inputs thereto accessible externally of the cassette, said logic circuit having an output in response to the application thereto of a preselected digital code word, the output of the logic circuit being connected to an output circuit of the counter means storing the digital output indication of the number of plays, whereby upon application of the correct code to the logic circuit in the form of a digital code word applied to the exteriorly accessible terminals, the digital count of the stored number of program play-backs is readable.

30. The combination according to claim 29, wherein the logic circuit comprises an "AND" circuit with multiple inputs connected to the exteriorly accessible terminals, preselected ones of said inputs being connected to said terminals through inverters to define the code word.

31. The combination according to claim 28, wherein the counter means includes means for resetting the count to zero, and the access circuit is connected with the means for resetting to permit resetting only upon application of said correctly coded signal.

32. The combination according to claim 27 further comprising information means in the cassette for electrically providing additional cassette information to at least one cassette output connection.

33. The combination according to claim 32, wherein the information means includes memory means in the cassette storing cassette information.

34. The combination according to claim 32, wherein the information means comprises means for deriving said further information from the signal representing a single play-back.

35. A video cassette play count decoding arrangement for use with a cassette having a memory, a counter and coded electrical locking means, other than memory addressing provisions for the memory, for selectively preventing and permitting access, in the absence and presence of a preselected coded signal, respectively, to a play count stored in the memory in the cassette representing a number of tape plays, wherein a single play-count is representative of a complete play-back of an entire video program, the decoding arrangement including terminal means externally accessible of the decoding arrangement and adapted to electrically connect to terminals on a cassette, means for applying an access code to the terminal means corresponding to a code of the coded electrical locking means of the cassette and appropriate to enable access to the play count stored in memory, and display means connected to the terminal means for displaying a play count applied to the terminal means from a cassette.

36. The combination according to claim 35, further comprising reset means connected with the terminal means for applying a reset signal to said terminal means, whereby a reset signal is provided for resetting a cassette play count counter.

37. The combination according to claim 35, wherein the terminal means comprises at least one terminal strip having a plurality of terminals, said means for applying a combination code comprising a network connecting a preselected number of terminals to ground and a preselected second number of terminals to a voltage source to define a digital code word.

38. The combination according to claim 37, wherein the means for displaying a play count comprises parallel digital input means connected to a plurality of the terminals and code conversion means for converting a digital word at the terminals to a numeric display.

39. A video tape cassette and play counting circuit combination including a cassette housing, means defining a path of tape movement along which a tape moves during playing thereof, wherein a single play count is representative of a complete play-back of an entire video program, detection means located in the housing proximate the path of tape movement and responsive to a play count indication of predetermined characteristics on the tape, means in the housing electrically connected to the detection means for producing an electrical play count signal in response to detection of the play count indication on the tape by the detection means and including signal processing means for shaping the count signal, and counting means in the housing connected for generating a count based on the count signal.

40. The combination according to claim 39, including a power source for the play counting circuit, said source being housed internally of the cassette housing.

41. The combination according to claim 39, wherein the signal processing means comprises an amplifier and a squaring circuit, said counting means being connected to the squaring circuit to derive said count based on each squared signal produced by the squaring circuit.

42. The combination according to claim 39, the counting means includes a counter with a digital encoded count output means for storing the count.

* * * * *